(12) United States Patent
Blake

(10) Patent No.: US 7,384,082 B2
(45) Date of Patent: Jun. 10, 2008

(54) FASCIA FOR A MOTOR VEHICLE WITH INTEGRAL COMPONENT MOUNTING AND A METHOD OF MAKING THE SAME

(75) Inventor: William D. Blake, Swanton, OH (US)

(73) Assignee: Magna International Inc., Concord, Ontario (CA)

( * ) Notice: Subject to any disclaimer, the term of this patent is extended or adjusted under 35 U.S.C. 154(b) by 67 days.

(21) Appl. No.: 10/568,320

(22) PCT Filed: Sep. 7, 2004

(86) PCT No.: PCT/CA2004/001595

§ 371 (c)(1),
(2), (4) Date: Feb. 16, 2006

(87) PCT Pub. No.: WO2006/021072

PCT Pub. Date: Mar. 2, 2006

(65) Prior Publication Data

US 2006/0267359 A1    Nov. 30, 2006

(51) Int. Cl.
*B60R 19/48* (2006.01)
(52) U.S. Cl. .................................... 293/117
(58) Field of Classification Search ............... 293/117
See application file for complete search history.

(56) References Cited

U.S. PATENT DOCUMENTS 5,860,685 A * 1/1999 Horney et al. .............. 293/113
6,039,367 A   3/2000 Muller et al.
6,203,366 B1 * 3/2001 Muller et al. ............... 439/561
6,318,774 B1  11/2001 Karr et al.
6,572,161 B2  6/2003 Wild et al.
6,839,943 B2 * 1/2005 Burkhardt et al. ............ 24/458

FOREIGN PATENT DOCUMENTS

DE    101 18 112 A1    10/2002
EP    1 249 372 B1     6/2006

\* cited by examiner

*Primary Examiner*—Dennis H Pedder
(74) *Attorney, Agent, or Firm*—Clark Hill PLC

(57) ABSTRACT

The invention provides fascia for a motor vehicle having a component mounting integrally molded to the fascia for holding and securing a component therein, the component mounting includes a containing portion having a through-hole for housing the component and for allowing the component to communicate therethrough, the containing portion being integrally molded to the fascia, and fastening means for securing the component in the component mounting, wherein the component mounting is designed for mounting the component from a side opposite to the show surface of the fascia. The fascia is made from a thermoplastic material having sufficient rigidity to maintain a positioning of the component and/or a continuity of a coating applied to at least a show surface of the fascia.

11 Claims, 3 Drawing Sheets

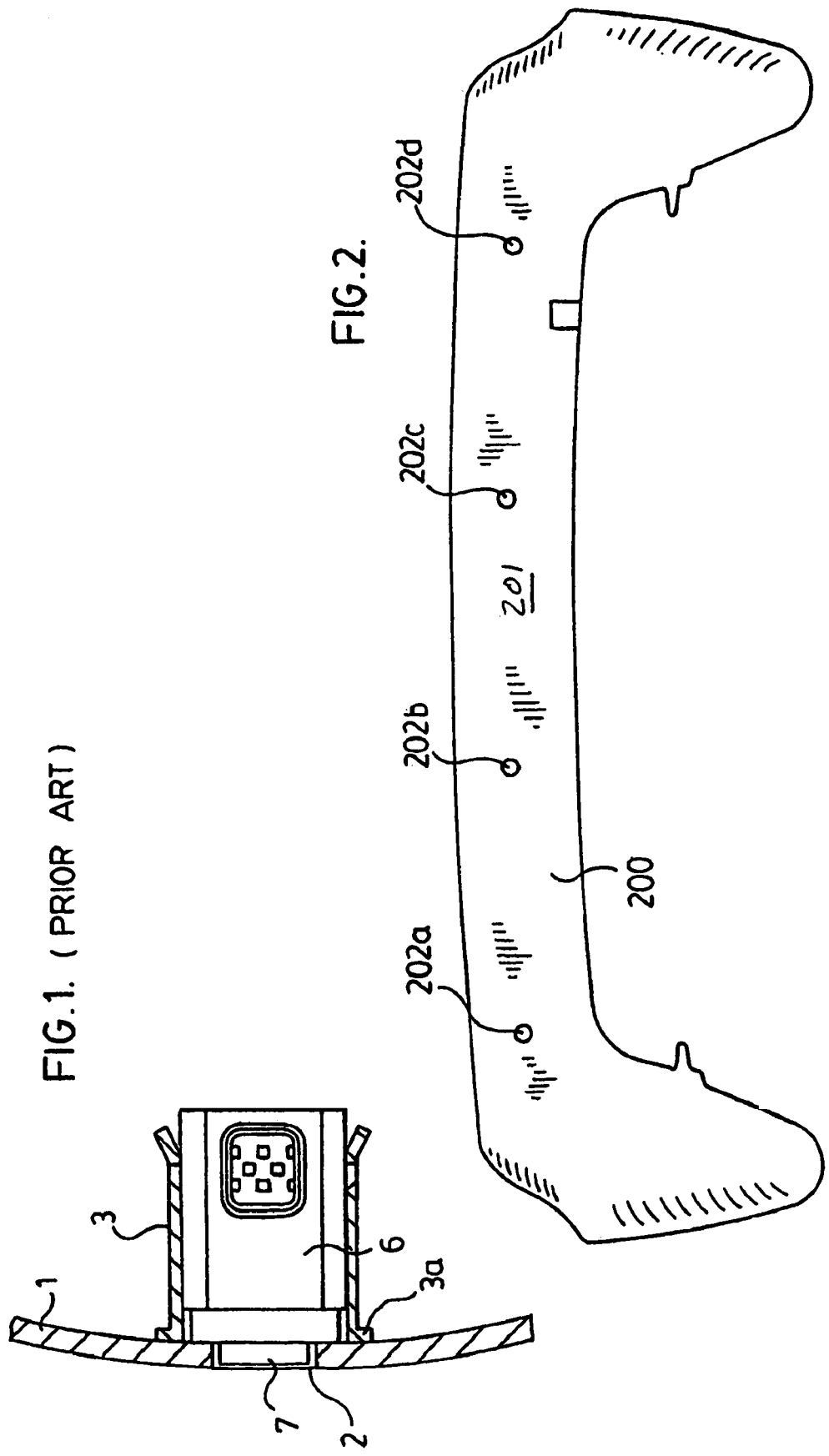

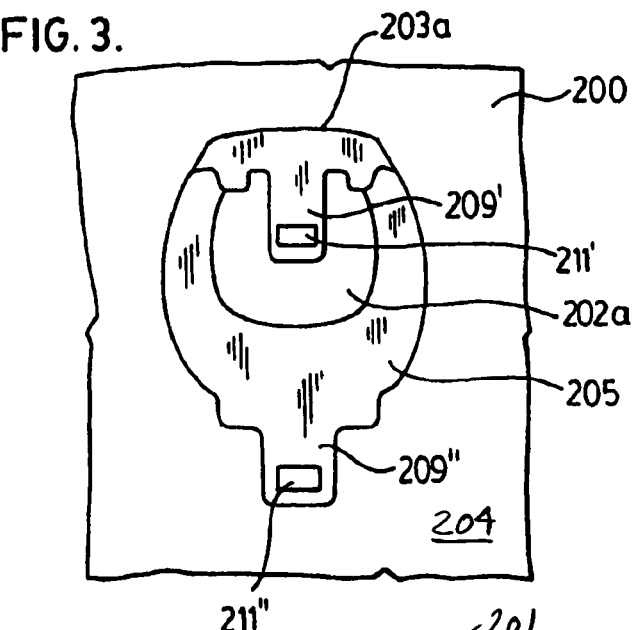
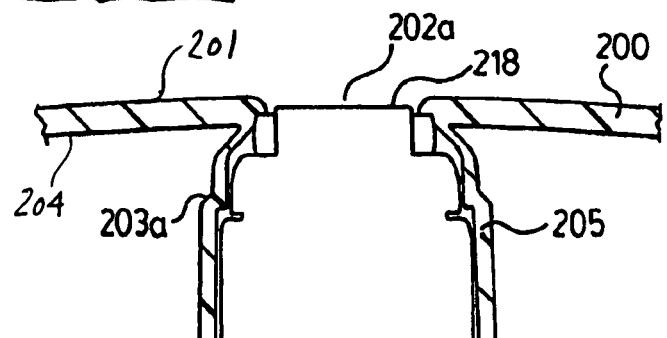
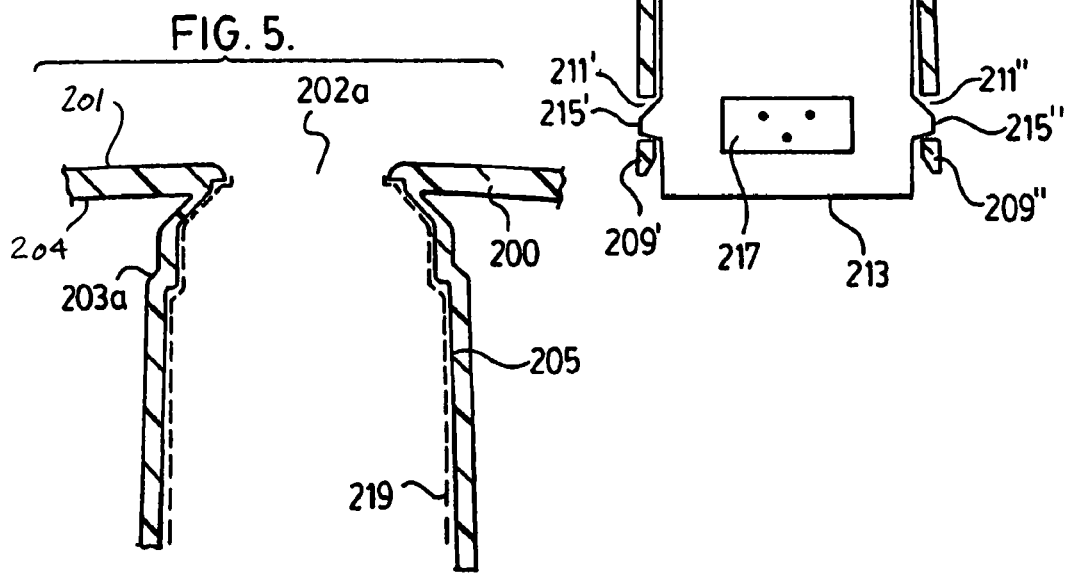

FASCIA FOR A MOTOR VEHICLE WITH INTEGRAL COMPONENT MOUNTING AND A METHOD OF MAKING THE SAME

FIELD OF THE INVENTION

The present invention generally relates to the field of fascias for motor vehicles and more particularly to a fascia for a motor vehicle with an integral component mounting.

BACKGROUND OF THE INVENTION

Sensors, such as ultrasound transducers or other electromagnetic sensors, are increasingly being placed in the fascia of motor vehicles for use with distance warning equipment, parking aids, and similar equipment. For example, positioning sensors, such as rear park assist sensors, are being used to detect objects via ultrasonic transducers. An audible beep reference to the proximity of the object to the fascia notifies the driver. As the beeps become closer together, the distance between the fascia and an object shortens.

Considering that these sensors are within an impact zone, their design must be robust, permanent, and repeatable, making tolerances for location, fit, and finish very tight. Thus, the sensors must be mounted such that when the fascias of vehicles are affected, especially by mechanical shock, any loosening or drop-out is prevented.

Typically sensors are value added components sub-assembled into the fascia. At present, secondary bracket(s) are snapped, adhered, or sonically welded to the fascia. In some instances it is necessary to punch out a hole(s) for an attachment of a sensor bracket(s) either before or after the fascias are painted.

The prior art methods of bracket attachments on fascias are mechanically attached or sonically welded to the fascia due to design requirements or quality considerations.

FIG. 1 shows a prior art modular mounting device for installation in the bumper 1 of a motor vehicle as disclosed in U.S. Pat. No. 6,318,774. The device includes a sensor bracket 3 that is configured to be tube-shaped and has an end face that is configured as a collar 3*a*. The bracket 3, at this end face 3*a*, is attached to a suitable bore 2 in the bumper 1 from the rear side of the bumper 1. For purposes of attachment, conventional joining technologies can be used such as adhesives, welding, or bolts. After the bracket 3 is attached to the bumper 1, an ultrasonic sensor 6 is installed from the rear into bracket 3 until the head piece 7 of sensor 6 in its end face rests roughly flush with the adjoining exterior surface of bumper 1.

Another mounting for a sensor to a bumper of an automobile is disclosed in U.S. Pat. No. 6,203,366. The mounting is composed of two parts, a first part is cast onto the bumper and then a second part is connected to the first part such that it cannot be detached.

FIG. 1 shows a prior art modular mounting device for installation in the bumper 1 of a motor vehicle as disclosed in U.S. Pat. No. 6,318,774. The device includes a sensor bracket 3 that is configured to be tube-shaped and has an end face that is configured as a collar 3*a*. The bracket 3, at this end face 3*a*, is attached to a suitable bore 2 in the bumper 1 from the rear side of the bumper 1. For purposes of attachment, conventional joining technologies can be used such as adhesives, welding, or bolts. After the bracket 3 is attached to the bumper 1, an ultrasonic sensor 6 is installed from the rear into bracket 3 until the head piece 7 of sensor 6 in its end face rests roughly flush with the adjoining exterior surface of bumper 1.

Another mounting for a sensor to a bumper of a automobile is disclosed in U.S. Pat. No. 6,203,366. The mounting is composed of two parts, a first part is cast onto the bumper and then a second part is connected to the first part such that it cannot be detached.

U.S. Pat. No. 6,572,161 to Wild et al. discloses yet another mounting for attaching a component to the bumper of a car wherein two flexible tongues are injection molded at their feet onto the bumper. These tongues are resilient and are perpendicular to the surface of the bumper at the opening which receives the component. The tongues can be molded with the bumper or molded in place. However, in order to provide sufficient support for the component attached to the tongues an additional mounting component is necessary, in the form of a bridge. The bridge joins the tongues together in their base area. This bridge makes the mounting stable and holds the component in its position in the bumper.

U.S. Pat. No. 3,998,178 to Dutot et al. discloses a fitting of signal units or lamp mountings or holders, such as direction indicators, flashing lamps, or side lamps, on a motor vehicle. These units are adapted to be inserted into the bumper section from a show surface of the bumper of the vehicle. The bumper section is made from a flexible moulded material, such as rubber, to constitute at least part of the mounting for these luminous devices. The rubber material of the mounting expands substantially to engulf the optical units to retain them in the bumper section. However, it is difficult to provide a coating, such as a paint coating, a clear coat, or a metal plating, on a rubber bumper section. Rubber is a flexible material and a coating supplied on a rubber part would likely craze when the rubber is flexed. However, the mounting disclosed by Dutot et al. requires the flexibility of the rubber to mount the signal units in the bumper section.

The disadvantages of the described prior art mountings are cost, added components, and added operations involved in producing the parts and potential failures of bonded joints.

At present, there is a need for a mounting design that is more reliable and less obvious in the fascia than current styles that are mechanically assembled with bezels and snap rings. It is desirable to provide a component mounting for mounting components into a fascia of a motor vehicle that can be supplied with a coating.

It is desirable to provide a more cost effective component mounting to the fascia of automobiles.

It is further desirable to provide a mounting for components to the fascia of automobiles that reduces added components.

Furthermore, it is desirable to provide a mounting that is integrally molded to the fascia of an automobile.

SUMMARY OF THE INVENTION

In accordance with the invention there is provided, a fascia for a motor vehicle comprising a component mounting integrally molded to the fascia for holding and securing a component therein, the component mounting comprising a containing portion having a through-hole for housing the component and for allowing the component to communicate therethrough, the containing portion being integrally molded to the fascia; and fastening means for securing the component in the component mounting, wherein the component mounting is designed for mounting the component from a side opposite to the show surface of the fascia.

In accordance with another aspect of the invention, the fascia is made from a thermoplastic material having sufficient rigidity for maintaining one of a positioning of the component and a continuity of a coating applied to at least a show surface of the fascia.

In accordance with a further embodiment of the invention, the coating is a paint, a clear coat, or a metal plating, such as a chrome, nickel or copper plating.

In accordance with another aspect of the invention, the fastening means are releasable. In accordance with yet another aspect of the invention, the fastening means comprise first and second resilient members disposed diametrically opposite to each other.

In accordance with a further embodiment of the invention, the first and second resilient members comprise one of a projection and a recess for providing a snap connection to a complementary one of a recess and a projection of the component.

In accordance with yet a further embodiment of the invention, the through-hole has a complementary shape to the component.

In accordance with another aspect of the invention, the fascia further comprises elongated ridges along the fastening means for strengthening a retention of the component in the component mounting.

In accordance with another aspect of the invention, proximal end has a mounting wall stock thickness of about one third of a fascia wall stock thickness.

In accordance with yet another aspect of the invention, the fascia further comprises a parting line seal off where the proximal end of the containing portion meets the fascia for providing a paint quality and a parting line quality.

In accordance with yet a further aspect of the invention, the component mounting is a sensor bracket for mounting a sensor therein. In accordance with yet another aspect of the invention, the sensor is a parking assist sensor.

In accordance with a further aspect of the invention, there is provided a method of making a fascia for a motor vehicle comprising the steps of: providing a mold, the mold comprising a cavity, a core, and a core pin, said mold defining a shape of the fascia with an integral component mounting, the component mounting comprising a containing portion having a through-hole for housing the component, said containing portion having a proximal end and a distal end, the proximal end being integrally molded to the fascia, and fastening means for securing the component in the sensor bracket, said fastening means being disposed about the distal end of the containing portion; engaging the core pin with respect to the cavity and the core, said core pin for creating the through-hole; injecting an amount of thermoplastic material into the mold; allowing the thermoplastic material to set; and removing the core pin from the cavity and the core for allowing the removal of the fascia from the mold.

In accordance with another aspect of the invention, the core pin is designed so as to create a through-hole having a complimentary shape to an external contour of the component to be inserted into the component mounting.

In accordance with a further aspect of the invention, there is provided a fascia for a motor vehicle comprising: a sensor bracket integrally molded to the fascia for holding and securing a sensor therein, the sensor bracket comprising a containing portion having a through-hole for housing the sensor and for allowing the sensor to sense an object therethrough, said containing portion having a proximal end and a distal end, the proximal end being integrally molded to the fascia; and fastening means for securing the sensor in the sensor bracket, said fastening means being disposed about the distal end of the containing portion, and wherein the sensor bracket is designed for receiving the sensor from a side opposite to the show surface of the fascia.

In accordance with another aspect of the invention, the fascia is made from a thermoplastic material having sufficient rigidity for maintaining one of a positioning of the sensor and a continuity of a coating applied to at least a show surface of the fascia.

In accordance with yet another aspect of the invention, the fascia further comprises elongated ridges along the fastening means for increasing a retention of the sensor in the sensor bracket.

In accordance with yet a further aspect of the invention, the fastening means are releasable.

BRIEF DESCRIPTION OF THE DRAWINGS

Exemplary embodiments of the invention will now be described in conjunction with the following drawings wherein like numerals represent like elements, and wherein:

FIG. 1 shows a prior art modular mounting device for installation in a bumper of an automobile;

FIG. 2 shows a class "A" surface of a fascia for an automobile;

FIG. 3 shows a portion of a rear side of a fascia depicting an integral mounting in accordance with the invention;

FIG. 4 shows a schematic cross-sectional view of a mounting having a sensor inserted therein;

FIG. 5 shows a schematic cross-sectional view of a fascia with an integral mounting illustrating a hydraulic core pin during a molding process;

DETAILED DESCRIPTION OF THE PREFERRED EMBODIMENTS

Figure 6:
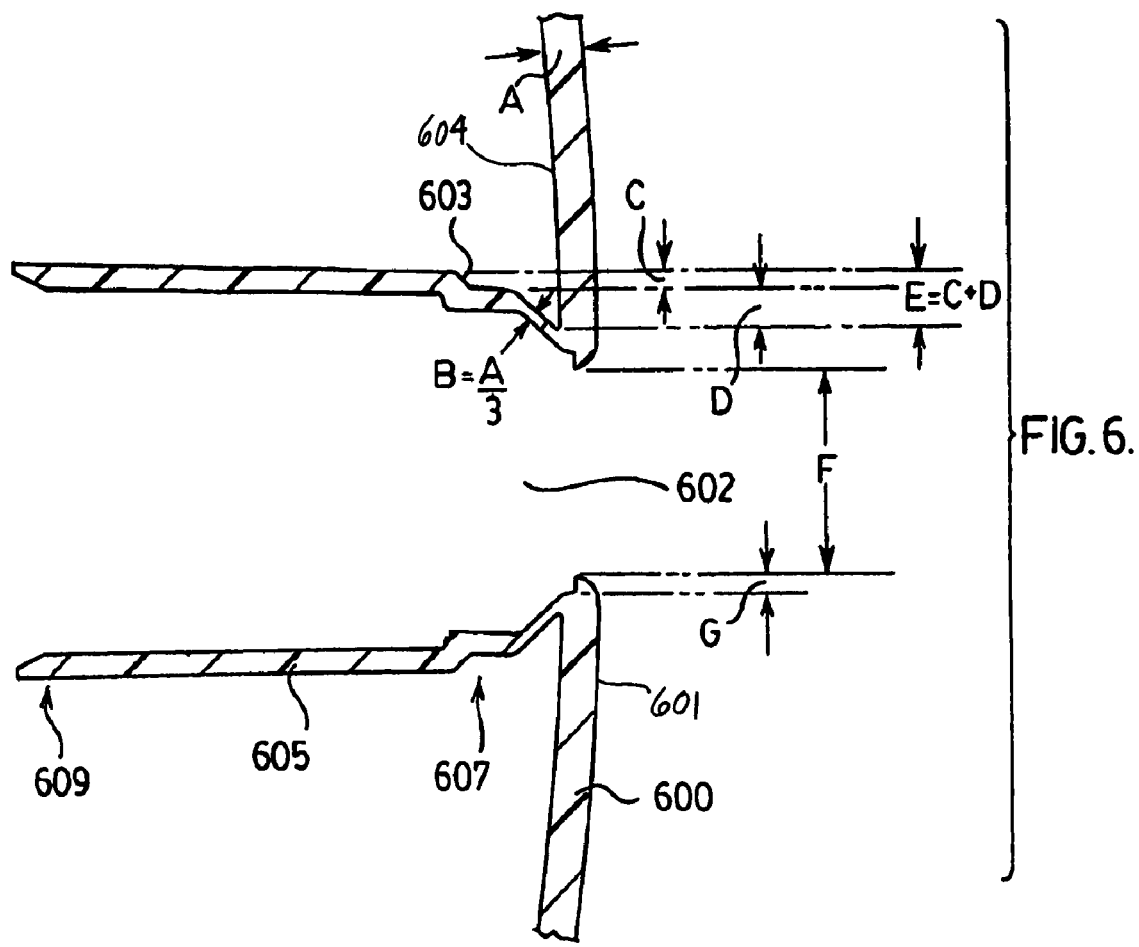
FIG. 6 shows a cross-sectional view of a fascia having an integral component mounting to illustrate a design of the fascia more clearly.

The present invention provides a fascia for an automobile having a mounting for a component, such as a sensor bracket, integrally molded to the fascia during a fascia molding operation. Providing the mounting as an integral part of the fascia reduces the number of secondary and ancillary operations to achieve a sensor bracket that is cheaper and has an increased strength, i.e. it is less prone to separation or failure in the field.

In comparison, for example, to the sonically welded method of attaching a sensor bracket, the integral molding of the bracket into the fascia provides a desired look at a reduced cost with more robustness.

The present invention eliminates hard costs of secondary molded components, secondary punching and welding operations including machinery as well as provides soft cost savings due to less handling damage and machinery floorspace savings within the facility.

Turning now to FIG. 2, a class A surface 201 of a fascia 200 of an automobile is shown. In this exemplary embodiment, fascia 200 has four integrally molded-in mountings for components. However, only through-holes 202a-d are visible from the class A or show surface 201 as the mounting is integrally molded to a B-side or rear side 204 of the fascia 200. The B-side 204 of the fascia 200 being opposite to and spaced apart from the show surface or class A surface 201. Having regard to FIG. 3, a portion of the rear side 204 opposite the show surface 201 of fascia 200 is shown depicting mounting 203a. Mounting 203a includes a containing portion 205 to house a component, such as a parking sensor, therein. The containing portion 205 has a proximal end and a distal end, wherein the containing portion 205 is integrally molded to the fascia 200 at its proximal end forming a through-hole 202a to allow a component (not shown) to communicate through the fascia 200. If the mounted component is a parking sensor, the through-hole 202a allows the parking sensor to sense an object therethrough. The distal end of the containing portion 205 includes fasteners 209', 209" to secure a component in mounting 203a. Advantageously, the fasteners 209', 209" are releasable. In accordance with the embodiment presented in FIG. 3, the fasteners 209', 209" are provided in the form of first and second resilient arms including first and second recesses 211', 211 ". A component (not shown) can be inserted into the mounting 203a from the rear side 204 opposite to the show surface 201 of fascia 200 until complimentary projections on the component snap into recesses 211', 211" to fasten and secure the component in the mounting 203a. Alternatively, the arms can include projections and the component to be mounted in the mounting 203a is provided with complementary recesses to afford a snap connection between the mounting 203a and the component. The snap connection can be designed to be elastic so that when the snap connection is disengaged, for example by flexing the arms, the component can be released from the mounting 203a and removed.

However, the invention is not intended to be limited to the use of snap connections. The component can also be attached by other releasable methods, such as screws or bolts, or alternatively, the component can be attached in a non-releasable manner.

Advantageously, the fasteners 209', 209" are disposed diametrically opposite to each other.

In accordance with an embodiment of the present invention, the fascia 200 is made from a thermoplastic material having sufficient rigidity to maintain a continuity of a coating applied to the show surface 201 of the fascia 200 so as to avoid a crazing of the coating applied to the fascia 200. As of late, it is desirable to provide a paint coat on the fascia 200 to match the color of the automotive vehicle or to provide a particular color scheme to an automotive vehicle. Other coating applications are clear coats or metal platings, such as chrome, nickel, or copper plating. The material of the fascia 200 needs to have sufficient rigidity to support such coatings thereon.

Furthermore, in some applications, such as in the case of parking assist sensors, a sufficient rigidity of the component mounting 203a in the fascia 200 is required to maintain a positioning of the sensing unit in the component mounting 203a so as to prevent a misalignment of the sensor and hence a faulty feedback from the sensor.

Having regard to FIG. 4, a schematic cross-sectional view of the mounting 203a is shown having a sensor 213 inserted from the rear side 204 opposite to the show surface 201 of the fascia 200. Sensor 213 is fastened to the mounting 203a by means of projections 215' and 215" in respective recesses 211', 211" of the fasteners 209' and 209". The fasteners 209', 209" are configured on the containing portion 205 so as to be resilient, so that when the projections 215', 215" and recesses 211', 211" are disengaged, sensor 213 is released and can be removed from mounting 203a. Sensor 213 can be electrically connected to a control device via connecting member 217.

In accordance with an embodiment of the invention, sensor 213 is inserted into mounting 203a so as to be flush with the adjoining show surface 201 of fascia 200 and hence it is hardly noticeable. Only a small end face 218 of sensor 213 is visible from the show surface 201 of fascia 200. In order for the sensor 213 to be as inconspicuous as possible, the end face 218 that is showing through to the show surface 201 is painted the same color as the fascia 200.

In a further embodiment of the invention, the through-hole 202a of mounting 203a has a complementary shape to sensor 213 to securely hold the sensor therein, as can be seen in FIG. 4.

FIG. 5 shows a schematic cross-sectional view of mounting 203a of fascia 200. The through-hole 202a of mounting 203a is achieved by means of using a hydraulic core pin 219 during the molding process. The hydraulic core pin 219 is configured so as to create a through-hole 202a having a complimentary shape to an external contour of sensor 213 to be inserted into mounting 203a.

FIG. 6 shows a cross-sectional view of a fascia 600 having an integral component mounting 603 to illustrate more clearly a design of fascia 600 in accordance with another embodiment of the invention. Component mounting 603 has a containing portion 605 having a proximal end 607 and a distal end 609. The containing portion 605 is integrally molded to the fascia 600 at its proximal end 607 forming a through-hole 602 therethrough. A fascia wall stock thickness is designated as "A" in FIG. 6 and a mounting wall stock thickness is designated as "B". The mounting wall stock thickness "B" is advantageously one third of the fascia wall stock thickness "A" so as to reduce sink marks on a show surface 601 to a minimum. A wall stock thickness ratio of one third is a standard guideline for creating backside flanging perpendicular to a normal show surface. Alternatively, sink marks are reduced by increasing the fascia wall stock thickness about the proximal end 607 of the containing portion 605 where mounting 603 is integrally molded to fascia 600.

Furthermore, in order to achieve the design of the proximal end 607 as illustrated in FIG. 6, a lifter travel distance "E" is required to remove the molded fascia 600 from the mold. The lifter travel distance "E" is the sum of distances "C" and "D". The design of through-hole 602 is achieved by employing a hydraulic core pin (not shown in this figure) during the molding process. The hydraulic core pin is also removed from the mold after the molding process is finished to allow the fascia 600 to flex freely so as to release the molded fascia 600 from the mold.

In accordance with yet a further embodiment of the invention, a parting line seal off "F" is provided where the proximal end 607 of the containing portion 605 meets fascia 600. The parting line seal off applies to a cavity to core condition that meet to create an opening in the part. The parting line seal off "F" is provided to increase a paint quality and a parting line quality. The provision of the parting line seal off "F" avoids a sharp edge at this end of through-hole 602, thus allowing the paint to stay on well. In accordance with this embodiment of the invention, a component to be inserted into mounting 603 from a rear side 604 of fascia 600 is approximately flush with the show surface 601 of fascia 600 with a small clearance remaining to the show surface 601. Furthermore, the "flat" portion designated with "G" in FIG. 6 provides support to a decoupling ring when a sensor is inserted into the bracket and an interference fit for the securing snaps to engage and press against.

Figure 7:
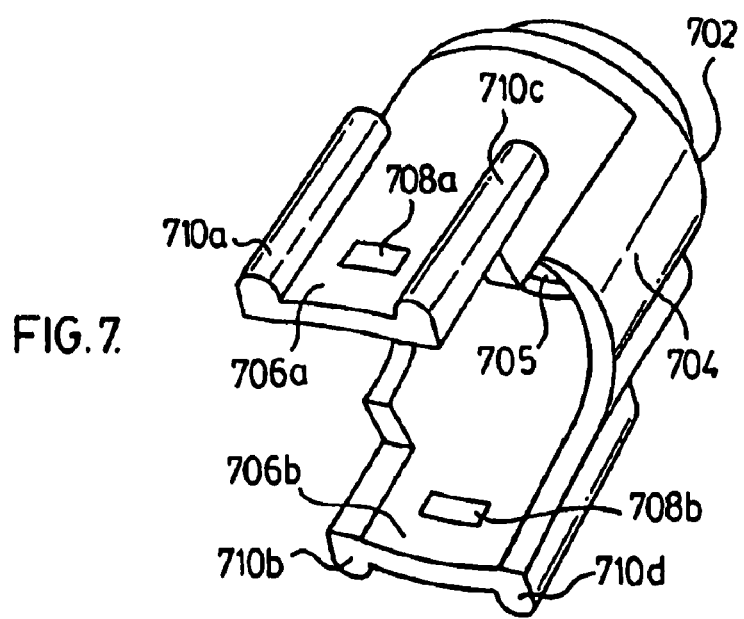
FIG. 7 depicts a perspective view of another embodiment of the component mounting in accordance with the invention.

FIG. 7 depicts a perspective view of another embodiment of a component mounting 702 in accordance with the invention. Component mounting 702 includes a containing portion 704 having a through-hole 705. The containing portion 704 further includes fasteners 706a and 706b to allow a component to be secured in the containing portion 704. Advantageously, the fasteners 706a and 706b are releasable. The fasteners 706a and 706b are provided in the form of resilient arms including recesses 708a and 708a, and elongated ridges 710a-d along edges of the fasteners 706a and 706 b increase or strengthen a retention of the component in the component mounting 702 by making the arms less resilient.

Advantageously, the invention reduces assembly content. Furthermore, providing fascias with integrally molded component mountings can reduce a plurality of sub-components as in traditional designs. Moreover, the need for painting bezels, secondary tooling, and associated labor are also removed.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. A fascia for a motor vehicle comprising:
    a rear side opposite to and spaced apart from a show surface;
    a sensor bracket integrally molded to the fascia for holding and securing a sensor therein, the .sensor bracket comprising
    a containing portion having a through-hole for housing the sensor and for allowing the sensor to sense an object therethrough, said through-hole defining a rounded edge at the show surface of the fascia and a flat portion generally parallel to the rear side and disposed between the rear side and the show surface, said containing portion having a proximal end and a distal end, the proximal end being integrally molded to the rear side of the fascia; and
    fastening means for securing the sensor in the sensor bracket with one end of the sensor abutting the flat portion, said fastening means being disposed about the distal end of the containing portion, and
    wherein the sensor bracket is designed for receiving the sensor from the rear side opposite to the show surface of the fascia.

2. The fascia as defined in claim 1 wherein the fascia is made from a thermoplastic material having sufficient rigidity for maintaining one of a positioning of the sensor and a continuity of a coating applied to at least the show surface of the fascia.

3. The fascia as defined in claim 2 wherein the coating is one of a clear coat, a paint, and a metal plating.

4. The fascia as defined in claim 1 wherein the fastening means are releasable.

5. The fascia as defined in claim 1 wherein the fastening means comprise first and second resilient members disposed diametrically opposite each other.

6. The fascia as defined in claim 5 further comprising elongated ridges extending along the first and second resilient members for increasing a retention of the sensor in the sensor bracket.

7. The fascia as defined in claim 5 wherein the first and second resilient members comprise one of a projection and a recess for providing a snap connection to a complementary one of a recess and a projection of the sensor.

8. The fascia as defined in claim 1 wherein the through-hole has a complementary shape to the sensor.

9. The fascia as defined in claim 1 wherein a proximal end of the containing portion adjacent the rear side of the fascia has a mounting wall stock thickness of about one third of a fascia wall stock thickness.

10. The fascia as defined in claim 1 further comprising a parting line seal off where the proximal end of the containing portion meets the fascia for providing a paint quality and a parting line quality.

11. The fascia as defined in claim 1 wherein the sensor is a parking assist sensor.

* * * * *